Figure 1:
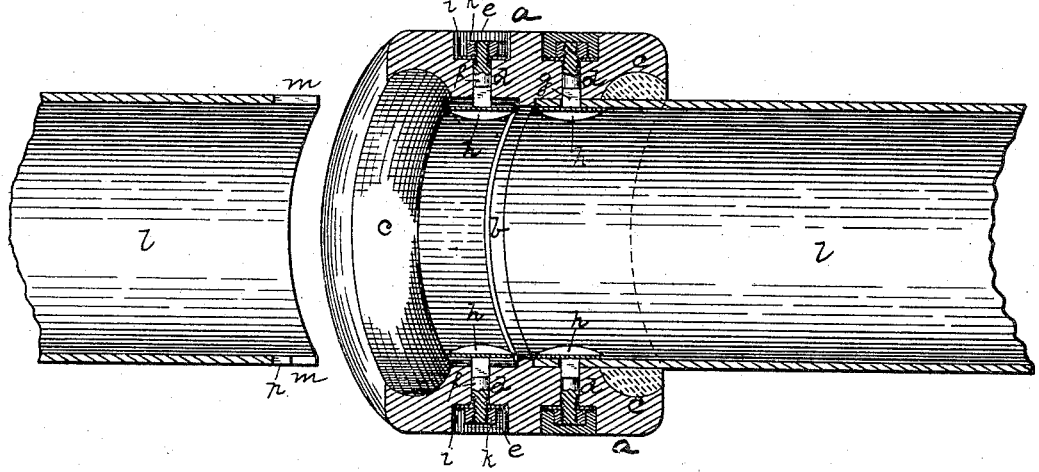

(No Model.)

J. NORTON & S. BRIGGS.
PIPE JOINT FOR GAS MAINS.

No. 371,782. Patented Oct. 18, 1887.

Witnesses:
J. E. Barnes
M. M. Weaver

Inventors:
John Norton
Samuel Briggs
By James F. Kay
Attorney

United States Patent Office.

JOHN NORTON AND SAMUEL BRIGGS, OF McKEESPORT, ASSIGNORS TO EDMUND C. CONVERSE, OF ALLEGHENY CITY, PENNSYLVANIA.

PIPE-JOINT FOR GAS-MAINS.

SPECIFICATION forming part of Letters Patent No. 371,782, dated October 18, 1887.

Application filed June 1, 1886. Serial No. 203,766. (No model.)

*To all whom it may concern:*

Be it known that we, JOHN NORTON and SAMUEL BRIGGS, of McKeesport, in the county of Allegheny and State of Pennsylvania, have invented a new and useful improvement in Pipe-Joints for Gas-Mains; and we do hereby declare the following to be a full, clear, and exact description thereof.

Our invention relates to pipe-joints and other conduits, having special reference to that class of joints in which the ends of the tube-sections are unthreaded and engage with a coupling collar or sleeve by means of suitable locking devices, the collar or sleeve having annular calking-recesses at the ends to receive lead or other suitable calking or packing material, by means of which a tight joint is obtained. The coupling sleeve or collar heretofore principally employed is what is known as the "Converse Lock-Joint Coupling," the construction of these joints being clearly shown in Letters Patent No. 263,863, granted to E. C. Converse, dated September 5, 1882, the cast-metal collar or sleeve shown in this patent having suitable locking-recesses, in which lugs on the tubing enter, and the lugs being confined within their recesses and a tight joint being formed by the calking material in the recesses at the ends of the coupling-sleeves.

One of the difficulties found in forming these Converse lock-joint couplings was the labor in handling the pipes in securing the rivets thereon and fitting the pipe-sections to the coupling-collar so as to insure a free entrance into and perfect fitting of the pipe within the collar when the joint is made within the trench in which the conduit or gas-main is laid, it being necessary in securing the locking-lugs to the tube-section first to punch holes therefor and subsequently to insert the bolts and swage down the heads on the interior of the pipe, this latter operation often causing the bending of the end of the pipe-section out of shape and requiring extra labor in turning it up so that it would enter the coupling-collar easily and not cause difficulty in laying the main within the trench. The cost of carrying the pipe-sections from the punching-machine to the swaging-bench, where the coupling-collar was secured on one section, also increased the cost of manufacture of the tubing on account of the extra handling thereof. To overcome these difficulties, as well as to provide a coupling in which the engaging parts shall be loose or movable, so that they shall not require so careful a fitting, is the object of our invention.

To these ends it consists in combining with a coupling collar or sleeve having calking-recesses at the ends and pins or bolts therein, pipe-sections having locking slots or recesses punched therein, by means of which the pipe-sections engage with the pins or bolts within the coupling-collar, and so retain the tube-sections within the coupling-sleeve and against longitudinal strain, while the calking material in the annular calking-recesses at the ends of the collar prevents leakage from the joint.

It also consists in forming these engaging-pins within the coupling-sleeve of bolts provided with heads fitting on the interior of the tube-section and fitting against the locking-slot, so as to prevent the leakage of lead or other calking material through said slot, and the filling or partial filling of the pipe therewith.

It also consists in securing the bolts loosely within bolt-holes in the coupling-heads, so that the locking recesses in the pipe-sections will engage more easily with the bolts, and for this reason a careful fitting is not required, the bolts being subsequently tightened up and the bolt-holes within which they fit closed by calking material.

To enable others skilled in the art to make and use our invention, we will describe the same more fully, referring to the accompanying drawings, in which—

Figure 2:
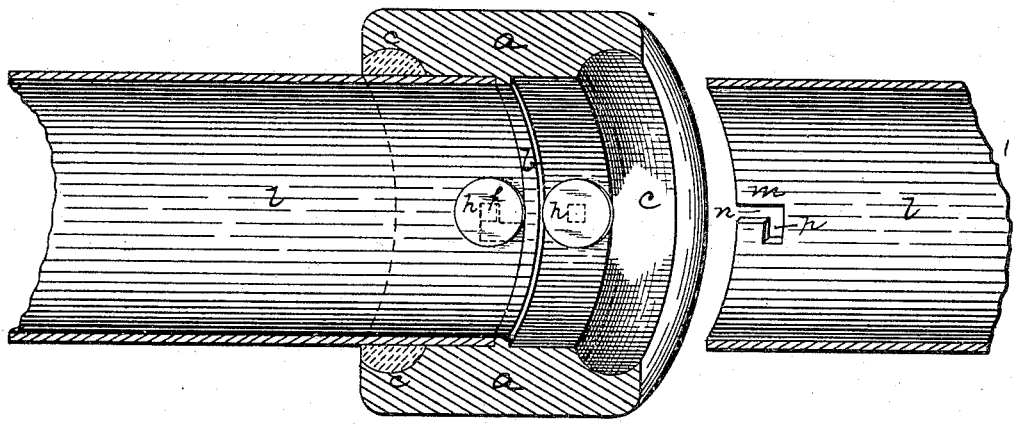
Figure 3:
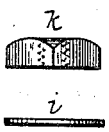

Figure 1 is a longitudinal sectional perspective illustrating our invention. Fig. 2 is a like longitudinal sectional perspective at right angles to Fig. 1; and Fig. 3 is a side view of the engaging-bolt, its washer and nut.

Like letters of reference indicate like parts in each figure of the drawing.

The coupling sleeve or collar *a* is cast to shape, being generally provided with the central ring, *b*, against which the ends of the pipe-section butt or bear, and with the annular calking-recesses *c* at the ends of the collar, by means of which a tight joint is formed, the calking-recesses being filled with lead or other suitable packing or calking material when the joint is made, and suitably tamped or calked. Extending through the collar *a* are the bolt-holes *d*, said bolt-holes being enlarged at the outer ends, so as to form circular recesses *e*, in which the nuts of the engaging-bolts fit, and which receive the calking material to inclose the bolts after the joint is made. The bolts *f* are formed of suitable length, and extend through the bolt-holes *d*, there being preferably squared necks *g* on the ends of the bolts, which prevent their turning, and the bolts having flat heads *h*, which are preferably curved, as shown, corresponding to the curvature of the interior of the pipes in which they fit, as hereinafter described, the bolts extending through the bolt-holes *d*, and being provided with washers *i*, which fit over the bolts and against the base of the circular recesses *e*, the nuts *k* being screwed onto the bolts above the washers. The tube-sections *l* are formed of the ordinary wrought-metal tubing, which is connected to the tube-sections without threading, this class of tubing being generally about one-third lighter than the ordinary threaded tubing, as its ends are not weakened by the cutting of the threads therein. Punched in the ends of the tubing are the locking-slots *m*, these slots being formed of the straight slot *n*, with an engaging-pocket, *p*, extending to one side thereof, the locking-recesses *m* being formed of width corresponding to the square neck of the bolt forming the engaging-pin within the coupling-collar, and as the pipe-section is inserted within the coupling-sleeve the bolt *f* enters this locking-recess, passing first through the slot *n*, and thence into the pocket *p*, and the tube-section being thus retained within the coupling-collar, the head *h* of the engaging-bolts extending over and closing the locking-recesses, and so preventing the escape of any lead or other calking material through this slot, in case it should find entrance into the same.

In forming joints by our improved coupling, after the casting of the coupling-collar, the bolts *f* are inserted within their bolt-holes and secured therein by the nuts *i*, the bolts *k* of these nuts fitting within their bolt-holes and being capable of slight longitudinal and slight lateral play. The pipe-section is then inserted, and the slots pass over the necks *g* of the bolts, and upon giving the pipe a slight turn these necks *g* enter the locking-pockets *p* in the punched locking-recesses *m* at the end of the pipe, so securing the pipe-section within the collar. When this is done, the operator, by means of a small wrench, turns the nuts *k*, so as to draw the heads *h* of the bolts tight against the interior wall of the pipe-section, the bolts being prevented from turning by their squared necks *g*, and as the curvature of the bolt-heads *h* corresponds to that of the tubing, it is evident that the heads will fit closely against the interior wall of the tubing, and drawing against the same will press those portions of the pipe-section firmly against the interior of the coupling-sleeve. When the pipe-section is thus drawn to place by the tightening up of the bolts, the annular calking-recesses *c* at the ends are filled and calked, the lead entering said calking-recesses, and in case an opening should be provided to enter the slot *m* the escape of lead through said slot into the pipe being prevented by means of the head *h* on the bolt. The circular calking-recesses *e*, in which the nuts *k* and washers *i* rest, are then filled with lead and calked, when the joint is completed.

In forming the joint it is evident that the cost of handling the pipe is largely reduced, as, after the testing of the pipe-section, all that is necessary is to punch the locking-recesses *m* in their ends by suitable machinery, when the pipe is ready for connection with the coupling-collar, and instead of being taken to the swaging-bench for the insertion of the engaging rivets or lugs, and, as is often the case, bent out of shape during the securing of these rivets or lugs, the pipe-sections are taken directly to the pouring-bench and the pipe-sections secured thereto, as before described.

The pipe-sections can be secured to the coupling-sleeves with but little trouble, and they have the advantage of preventing escape of the calking material into the interior of the tubing, as the heads of the bolts close the engaging-slots and draw the tube-sections firmly against the interior of the collar, so as to form a much tighter and stronger connection between the collar and pipe-section than is obtained by the simple lug within the recess, and at the same time in connecting the pipe-section to the coupling-collar, as the bolt is loose therein, the pipe-section can be entered more easily, and even if it is bent slightly out of shape in transportation there is little or no difficulty in securing it in place.

What we claim as our invention, and desire to secure by Letters Patent, is—

1. In joints for gas and similar mains, the combination, with the coupling sleeve or collar provided with the annular calking-recesses at the ends, of the tube-sections provided with locking slots or recesses punched therein, and engaging-bolts secured to the collars and fitting within said locking-recesses, and provided with heads fitting the interior of the tubing and closing the said locking-recesses of the tubing, substantially as and for the purposes set forth.

2. In joints for gas and similar mains, the combination, with the coupling sleeve or collar having the annular calking-recesses *c* at the ends thereof, of pipe sections having the engaging-slot *m*, punched in the ends thereof, and the bolt *f*, provided with the head *h*, fitting the interior of the tubing, and the squared neck *g*, to prevent the turning of the bolt, substantially as and for the purposes set forth.

3. In joints for gas and similar mains, the combination, with the coupling sleeve or collar provided with the annular calking-recesses at the ends, and the bolt-holes $d$, having circular calking-recesses at the outer ends thereof, of the bolts $f$, engaging with locking-recesses $m$ in the tube-sections $l$, the nuts $k$, fitting within said circular recesses, and suitable calking material for closing said recesses, substantially as and for the purposes set forth.

In testimony whereof we, the said JOHN NORTON and SAMUEL BRIGGS, have hereunto set our hands.

JOHN his × mark. NORTON.
SAML. BRIGGS.

Witnesses:
PETER PATTERSON,
GEORGE MARS.